Sept. 4, 1928.  J. D. MOHR  1,682,764
TRICK AUTOMOBILE
Filed March 5, 1927  3 Sheets-Sheet 1

INVENTOR.
John D. Mohr
BY Fredk C. Fischer
ATTORNEY

Sept. 4, 1928.  J. D. MOHR  1,682,764
TRICK AUTOMOBILE
Filed March 5, 1927   3 Sheets-Sheet 2
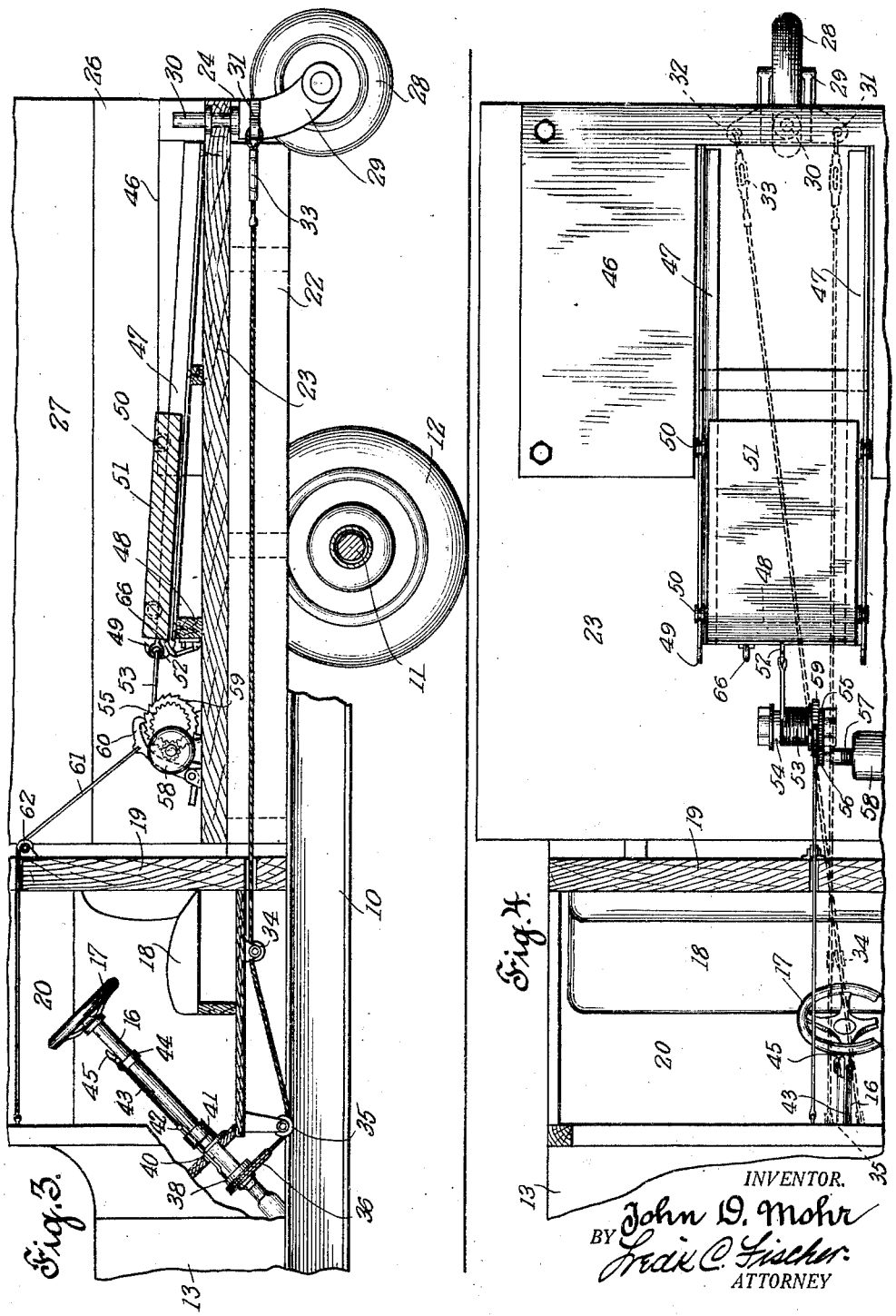
INVENTOR.
John D. Mohr
BY Fredk C. Fischer
ATTORNEY

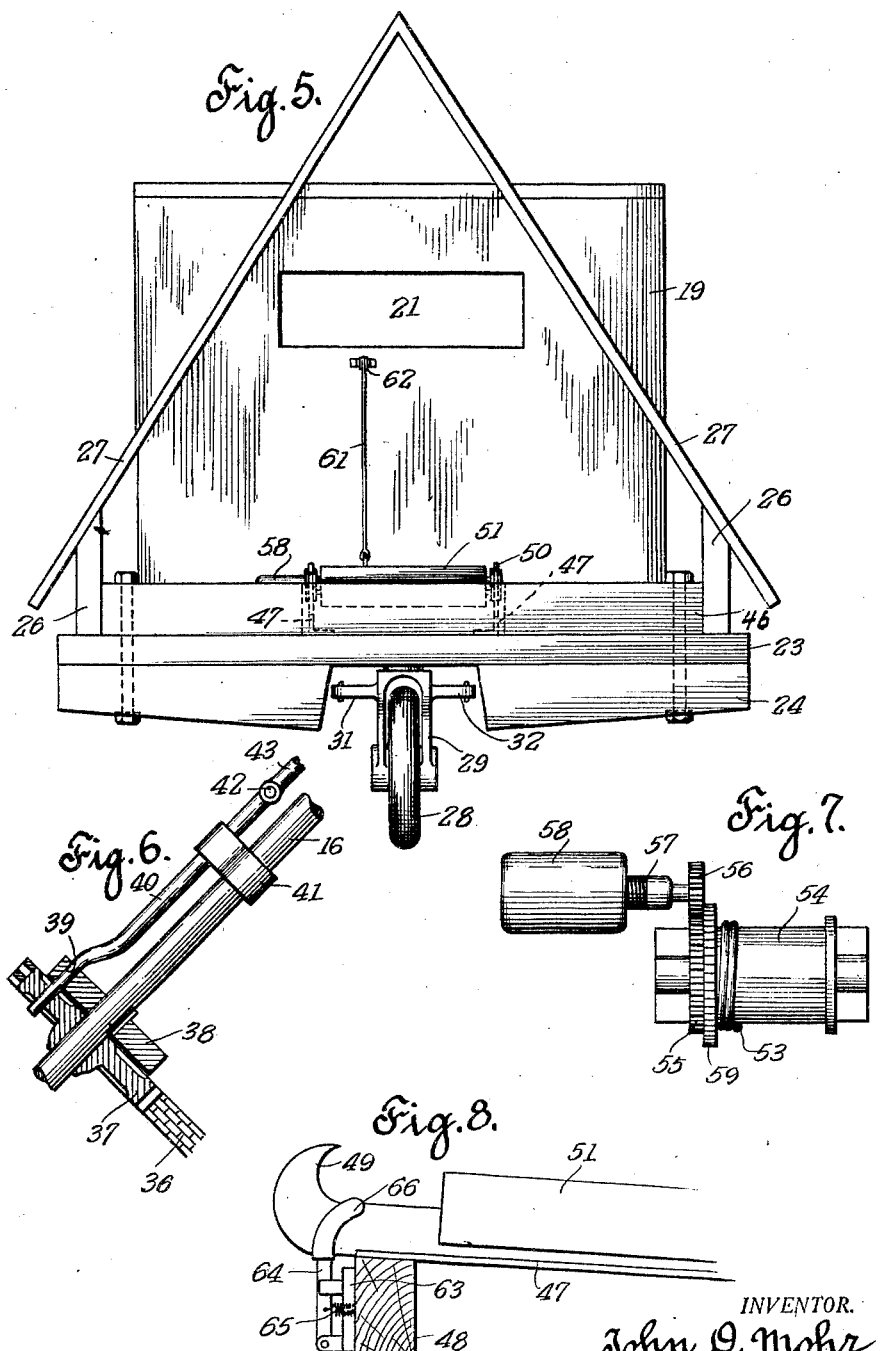

Patented Sept. 4, 1928.

1,682,764

UNITED STATES PATENT OFFICE.

JOHN D. MOHR, OF NEWARK, NEW JERSEY.

TRICK AUTOMOBILE.

Application filed March 5, 1927. Serial No. 172,981.

This invention relates to vehicles of the motor driven, wheeled type provided with steering means and equipped with the usual devices throughout.

It is the main purpose of the present invention to produce an advertising car certain to attract attention by reason of its peculiar action which consists of an ability to raise its forward wheels completely off the ground surface, in the manner of a bucking horse, and still continue to travel, in either direction, under the control of its operator.

This purpose is attained by the use of a shiftable weight, causing the vehicle body to pivot on its rear axle, a fifth wheel, at the rear, carrying a proportion of the weight when shifted, the single central rear wheel, at that time, acting in place of the raised front wheels, to direct the car, the same being guided by the operator, as well as the control of the shifting weight.

A further feature is the provision of ample surfaces, either inclined or vertical, to carry any desired advertisement in an attractive manner.

These objects are accomplished by the novel design, construction and arrangement of parts hreinafter described and illustrated in the accompanying drawings, constituting a material part of this disclosure, and in which:—

Figure 3 is a longitudinal sectional view of the body of the vehicle, illustrating the main elements for controlling the inclinable features of the vehicle and drawn to an enlarged scale.

Figure 4 is a plan view of the same.

Figure 5 is a rear end view of the vehicle.

Figure 6 is a fragmentary detail view of the steering means, parts being in section.

Figure 7 is a plan view of the weight shifting device and its drive.

Figure 8 is a side view of the switch control as actuated by the weight upon completion of its forward movements.

Figure 1:
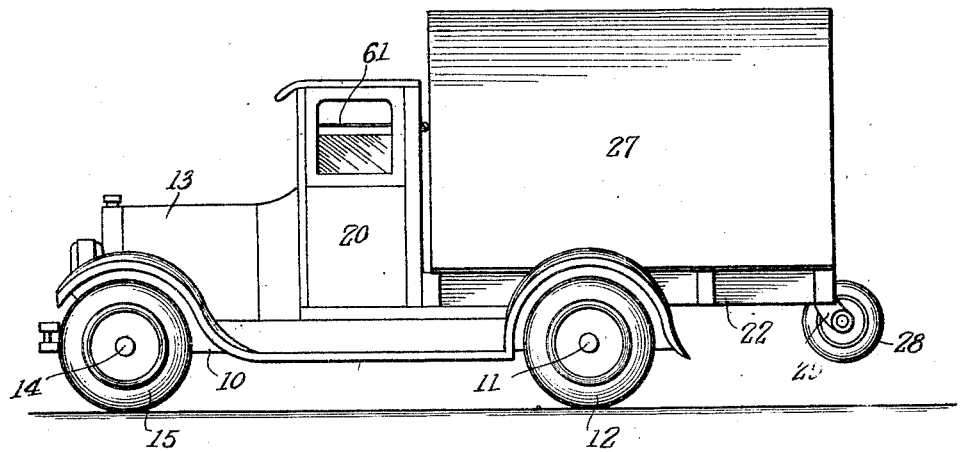
Figure 1 is a side elevational view of a vehicle embodying the invention, the same being shown in the normal position.

The vehicle illustrated is that of a conventional automobile type, consisting of a common chassis frame 10 mounted on a rear axle 11 having driving wheels 12 driven in the usual manner by a motor indicated by the casing 13.

The front axle 14 is provided with the customary dirigible wheels 15 controlled by a steering post 16 provided with a steering wheel 17 adjacent the driver's seat 18, the same being arranged in front of a partition wall 19 forming part of the driver's compartment 20, the same having a roof and being provided with windows in the manner of a truck, the partition having an opening 21 through which the rear portion of the vehicle may be seen.

Carried by the chassis, rearward of the compartment 20 is a rigid frame 22, extending outwardly past the rear axle 11, on which is a platform 23, its rear edge being bolted to a transverse beam 24 and on its upper surface is a fixed weight 46, bolted to platform 23 and beam 24.

Supported by side members 26, rising from the platform 23, are two cover plates 27 converging at their upper edges in the manner of a pitched roof, the apex of which is somwhat higher than the top of the driver's caboose 20, the lower edges of these plates extending outwardly just beyond the platform over the full length of which they extend.

A fifth wheel 28, preferably of lesser diameter than the wheels of the vehicle, is positioned centrally at the rear between the forks of a clevis 29 the stem 30 of which is journalled in platform 23, extending into fixed weight 46, to swivel in a vertical plane.

A pair of opposed arms 31 on the sides of the clevis have engaged at their ends cables 32 in which may be set turnbuckles 33 to adjust their tension, the forward portion of the cables passing below the platform 23, through openings in the partition 19, over guide pulleys 34 and under similar pulleys 35, where the cables are joined to the ends of a chain 36.

The bight of this chain is trained around a sprocket 37 mounted to freely rotate on the steering post 16, see Figure 6, and above the sprocket is a disc 38 keyed to the post.

The disc contains an opening 39 registrable with a similar opening in the web of the sprocket and engageable in these openings is the offset portion of a coupling rod 40, guided in a bearing 41 carried by the post.

The upper end of the rod 40 is connected by a hinge pin 42 to a bar 43 guided by a clip 44 fixed on the post 16 and provided with an actuating handle 45, adjacent the hand wheel 17, by which the coupling rod may be caused to connect the sprocket to the post so that the rear wheel 28 may be swivelled, and it is to be noted that in order to direct the vehicle, by the rear wheel, using the hand-wheel 17 in the same manner as when steering the front wheels, the cables must be crossed as indicated best in Figure 4.

Carried on the platform, rearward of the rear axle, is a heavy fixed weight 46 acting as a partial counter-poise for the weight of the motor and that part of the vehicle in front of the rear axle.

A pair of spaced longitudinal rails 47, here shown as rolled angles, are raised from the platform by a block 48, in advance of the rear axle, the front extremities 49 of the rails being upturned, and movable on the track thus formed are pairs of grooved wheels 50 fixed in the side edges of a shiftable poise 51, normally drawn to the front as far as possible, its weight when in that position being directly over the rear axle.

Fixed in the front end of the weight 51 is an eye 52 in which is secured one end of a cable 53 coiled on a spool 54 mounted for rotation and having fixed to it a gear 55 in mesh with a pinion 56 driven through the instrumentality of a "Bendix" type of yielding frictional drive 57 at the end of an electric motor 58.

Figure 2:
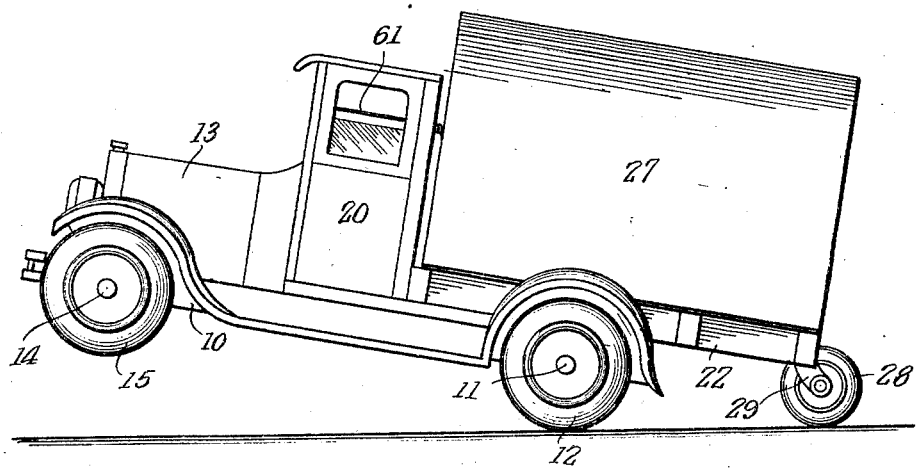
Figure 2 is a similar view of the same but shown in a tilted position with the front wheels raised from the surface.

Also fixed to the spool is a ratchet wheel 59 normally engaged by a pawl 60 to which is attached a cord 61 running over a pulley 62 through the caboose 20 to be accessible by the driver when it is desired to free the weight 51 by releasing the drum from the motor cause the body of the vehicle to tilt on the rear axle, at which time the wheel 28 makes contact with the surface and the front wheels 15 rise as shown in Figure 2, this effect occurring due to the preponderance of weight rearward of the rear wheel axle.

As has been described, when the vehicle is in a tilted position, it is steered and controlled in the same manner and by use of the same devices as when in a level plane.

The electric motor 58 may be driven by current from any self contained source, the same being controlled by a knife switch 63, its lever element 64 being drawn into engagement by a tension spring 65 and its upper rear reaching end 66 being disposed in the path of the weight 51 so that as it is drawn forward to a predetermined position, the switch will open and current to the motor cease.

From the foregoing it will be apparent that due to the peculiarities of behavior of the vehicle it is certain to attract attention and thus present any advertising matter disposed on the plates 27 in an advantageous manner.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. A self propelled four wheeled vehicle having a rear axle, a platform, a dirigible fifth wheel pivotally carried centrally at the rear of said platform on a horizontal axis, a shiftable weight, and means for moving said weight to cause the vehicle to tilt upon the rear axle whereby said fifth wheel is brought into contact with the surface and the forward wheels cleared therefrom.

2. A self propelled four wheeled vehicle having a rear axle, a platform, a dirigible fifth wheel pivotally carried centrally at the rear of said platform to rotate on a horizontal axis, a weight on said platform movable by gravity to cause the vehicle to tilt until said fifth wheel is in contact with the surface, and power means to shift said weight to restore the vehicle to its normal position.

3. A self propelled four wheeled vehicle having a rear axle, a platform, a fifth wheel carried centrally at the rear of said platform, a weight on said platform movable by gravity to cause the vehicle to tilt until said fifth wheel is in contact with the surface, motor driven means to shift said weight forwardly, a switch controlling the motor, and means actuated by said weight to open the switch when the weight reaches its forward position.

4. A self propelled vehicle having a rear axle provided with driving wheels and a front axle provided with dirigible wheels, a steering means for said dirigible wheels, a body extending past said rear axle, a fifth wheel at the end of said body normally raised from the surface, controllable means for tilting said body whereby said fifth wheel is brought into contact with the surface and said dirigible wheels raised therefrom, and operative connections from said steering means to the fifth wheel whereby the vehicle may be directed.

5. A self propelled vehicle having a rear axle provided with driving wheels and a front axle provided with dirigible wheels, a steering means for said dirigible wheels, a body extending past said rear axle, a fifth wheel at the end of said body normally raised from the surface, a stationary weight on the outer portion of said body, an inclined trackway on said body, a shiftable weight on said track-way to tilt the body on its rear axle when in one position and to retain it normal when in another position, means to move the weight on said track-way, means to retain the weight when in normal position, and a release device permitting the descent of said weight.

6. A self propelled wheeled vehicle having a pair of driving wheels, a pair of dirigible front wheels, a dirigible trailer wheel normally in a raised plane relative to the other wheels, means for shifting the center of gravity of the vehicle from one side to the other of the rear wheels whereby either the front wheels or the trailer wheel is brought into contact with a surface, and a single steering means for the front wheels and said trailer wheel.

7. A self propelled wheeled vehicle having a pair of driving wheels, a pair of dirigible front wheels, a dirigible trailer wheel normally held in a raised plane relative to the other wheels, controllable means for inclining the vehicle on the axis of the driving wheels whereby the front wheels or the trailer wheel may be brought selectively into operative position on the surface, means for steering the front wheels, and means associated therewith for steering said trailer wheel.

8. The combination with an automobile having flat unbroken sides, of a platform extending over its rear portion, a fixed weight carried on said platform rearward of the rear wheels, a track-way on said platform inclined downwardly at the rear, a counter-poise movable on said track-way, means for drawing said counter-poise upwardly on said track-way, means to retain said counter-poise when raised, and a releasing device for the counter-poise, said counter-poise controlling the normal or abnormal position of the automobile.

9. The combination with an automobile having flat unbroken sides, dirigible front and fixed rear wheels, of means for tilting the automobile on the axis of its rear wheels, a dirigible fifth wheel rotatable on a horizontal axis and normally in a plane above the other wheels, and a steering means for said fifth wheel combined with the steering means for the front wheels whereby the vehicle is directed when in a tilted position.

This specification signed this 25th day of February, 1927.

JOHN D. MOHR.